US010445802B1

(12) United States Patent
Adiseshan et al.

(10) Patent No.: US 10,445,802 B1
(45) Date of Patent: Oct. 15, 2019

(54) GIFTING DIGITAL CONTENT

(71) Applicant: Kausalya Adiseshan, Palo Alto, CA (US)

(72) Inventors: Kausalya Adiseshan, Palo Alto, CA (US); Anand Rajaraman, Palo Alto, CA (US)

(73) Assignee: Kausalya Adiseshan, Palo Alto, CA (US)

( * ) Notice: Subject to any disclaimer, the term of this patent is extended or adjusted under 35 U.S.C. 154(b) by 1198 days.

(21) Appl. No.: 14/183,428

(22) Filed: Feb. 18, 2014

(51) Int. Cl.
*G06Q 30/06* (2012.01)

(52) U.S. Cl.
CPC .................. *G06Q 30/0621* (2013.01)

(58) Field of Classification Search
CPC .......................................... G06Q 30/06–30/08
USPC ................................................. 705/26.1–27.2
See application file for complete search history.

(56) References Cited

U.S. PATENT DOCUMENTS

| | | | | |
|---|---|---|---|---|
| 6,684,248 B1* | 1/2004 | Janacek | ................... | H04L 63/12 709/217 |
| 2008/0172306 A1* | 7/2008 | Schorr | ................... | G06Q 30/02 705/26.41 |
| 2010/0146500 A1* | 6/2010 | Joubert | ..................... | G06F 8/61 717/178 |
| 2011/0145858 A1* | 6/2011 | Philpott | ................. | G06Q 30/02 725/32 |
| 2012/0011751 A1* | 1/2012 | Schimke | ............. | B42D 15/022 40/124.03 |
| 2012/0191569 A1* | 7/2012 | Shah | .................. | G06Q 30/0613 705/26.41 |
| 2012/0260190 A1* | 10/2012 | Berger | .............. | G06F 17/30867 715/739 |
| 2014/0089128 A1* | 3/2014 | Stauffer | ........... | H04N 21/47815 705/26.5 |

OTHER PUBLICATIONS

Callback Functions TutorialPosted by Marius Bancila on Sep. 16, 2005, https://www.codeguru.com/cpp/cpp/cpp_mfc/callbacks/article.php/c10557/Callback-Functions-Tutorial.htm (Year: 2005).*
Brenna Ehrlich, "Share Your Music Without Sharing Your Headphones", Mar. 31, 2011, http://mashable.com/2011/03/31/mystream/.

* cited by examiner

*Primary Examiner* — Ming Shui
(74) *Attorney, Agent, or Firm* — Van Pelt, Yi & James LLP

(57) ABSTRACT

Gifting of digital content is disclosed. Gifting information is received from a first client. The gifting information includes an indication of audiovisual content to be gifted, customization information, and recipient information associated with an intended recipient. The intended recipient is determined to not be registered based at least in part on the received recipient information. In response the determination that the intended recipient is not registered, an account for the intended recipient is generated dynamically. A customized version of the audiovisual content to be gifted is generated based least in part on the customization information. A gift alert text message to be sent to the intended recipient is prepared. The gift alert text message includes a link for receiving the customized version of the audiovisual content.

54 Claims, 8 Drawing Sheets

GIFTING DIGITAL CONTENT

BACKGROUND OF THE INVENTION

Individuals increasingly consume content (e.g., songs) digitally, instead of or in addition to buying physical media. Unfortunately, existing techniques for making gifts of digital content (where possible at all) are riddled with problems. In particular, the user experiences in both giving and receiving digital content are often frustrating and time-consuming, involving many barriers, steps, restrictions, and requirements. The complexity in gifting content ultimately discourages the practice of gifting.

BRIEF DESCRIPTION OF THE DRAWINGS

Various embodiments of the invention are disclosed in the following detailed description and the accompanying drawings.

DETAILED DESCRIPTION

Figure 1:
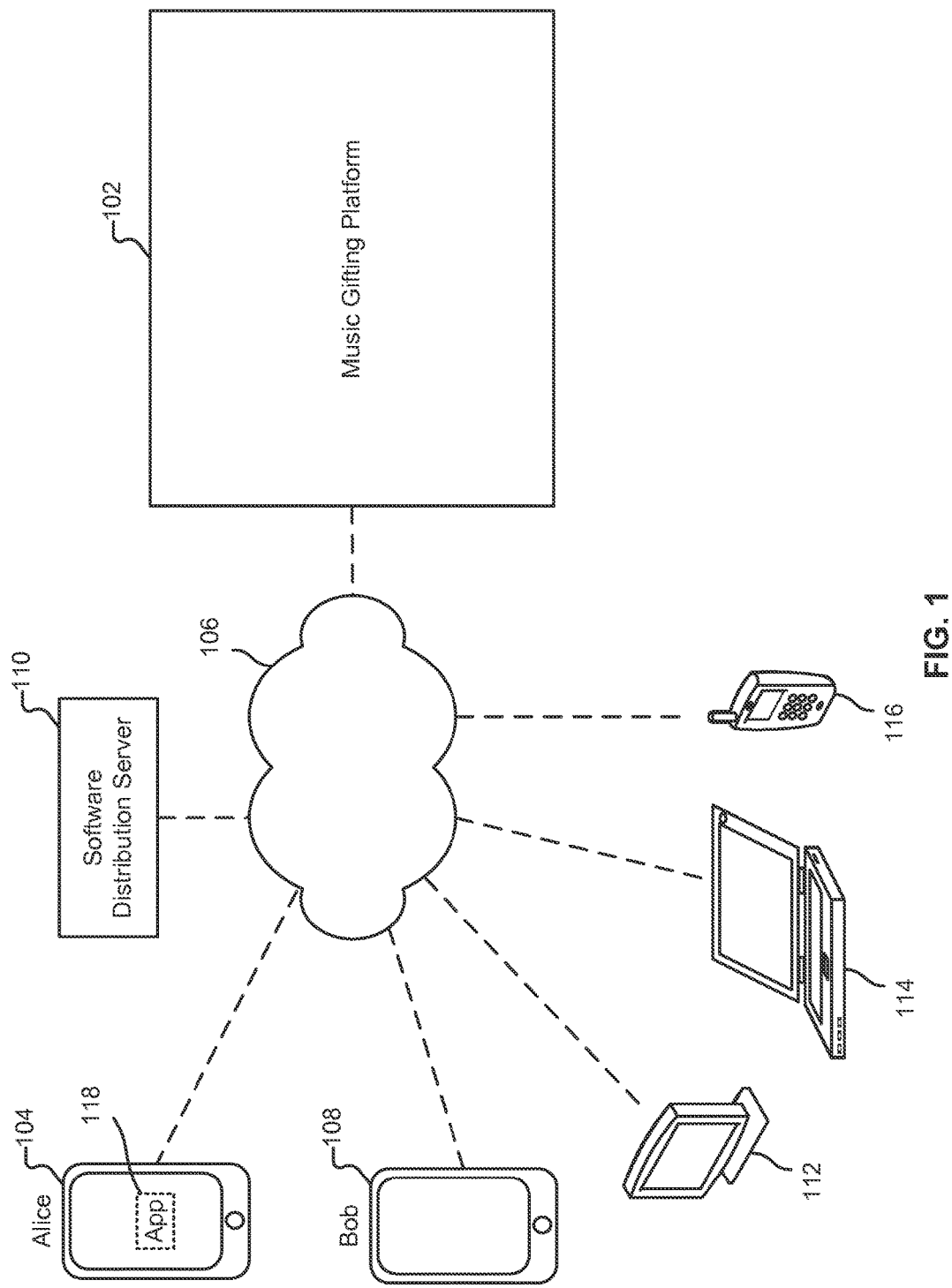
FIG. 1 illustrates an embodiment of an environment in which frictionless gifting of customized audiovisual content is facilitated via SMS.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are various techniques for gifting of digital content. As will be described in more detail below, using the techniques described herein, friction in the gifting of digital content (e.g., music or other audiovisual content) is reduced. As one example, the process for gifting music is simplified for gifters. For example, using the techniques described herein, gifters, via a gifting service, need only supply a phone number of the recipient and an identifier for the song they would like to send, after which the gifter's portion of the gifting transaction is complete. If the gifter has a smartphone device (e.g., iPhone®, Android® phone, Blackberry® phone, etc.) and has installed a mobile application for the gifting service that is configured for frictionless gifting of music, selection of the song to be gifted and the retrieval of the phone number of the recipient can all be done via the app. For example, in some embodiments, the app includes a catalog of songs through which the gifter can select a song. Additionally, the phone number can be retrieved automatically from the gifter's contacts manager (providing that the gifter has allowed the app access to the gifter's contacts manager). Additionally, the gifter can also be provided with the option to customize his/her gift, for example, by recording personalized messages to be incorporated into the song. For example, the app can leverage a microphone installed on a smartphone device to allow the gifter to record a message, which will be integrated into the gifted song.

Also as will be described in more detail below, using the techniques described herein, the process of receiving music is also simplified for recipients as well. For example, for recipients who are not subscribers to the service through which a song is gifted, accounts for the recipients are automatically generated on the recipients' behalf. Thus, when a recipient would like to access a gift, the recipient can immediately take possession of the auto-generated account, without having to go through the time-consuming process of registering for a new account. Additionally, the techniques described herein facilitate frictionless mobile-to-mobile gifting, in which a notification that a gift is pending can be sent to a recipient via text (e.g., short message service (SMS), multimedia messaging service (MMS), etc.), which is a messaging channel universal to all mobile phones, regardless of whether the phones have web access, whether the phones are of one particular type of operating system (e.g, iOS®, Android®, Blackberry OS®, Windows Phone®, etc.), etc. This allows for intended gift recipients to be immediately notified of gifts. In addition, for recipients with smartphones, the notifications can include universal resource locator (URL) links, which when activated/clicked on by the recipient, can automatically direct the recipient to a corresponding proprietary mobile application, which when installed on their phone, automatically syncs with their auto-generated account, allowing the recipient instant access to their new account and new gift. The text messages can also be sent from the gifter, who is a known and trusted source to the recipient, thereby encouraging the recipient to click on the link and accept the gift. Thus, in order to receive a gift, the recipient can simply click on a link provided in a text message, which will direct the recipient to accept their song via the account which has already been set up on the recipient's behalf, without the recipient having to go through a time-consuming registration process. By easing and reducing the number of steps (and friction) needed to be performed by the recipient to receive their gift, the recipient is incentivized to become a new member of the gifting service, as the barriers to entry and the effort required on the part of the recipient to become a member have been reduced.

Further details of frictionless gifting of customized audiovisual content via text messaging will be described in more detail below.

Environment

For purposes of illustration, an example of mobile-to-mobile gifting of a customized digital song is described below. Gifting of other audiovisual content, such as pictures and videos can be performed with the techniques described herein adapted accordingly. Additionally, other devices (e.g., tablets, laptops, gaming consoles, set-top boxes, etc.) can be used to gift/receive customized audiovisual content as well using the techniques described herein.

FIG. 1 illustrates an embodiment of an environment in which frictionless gifting of customized audiovisual content is facilitated via SMS. In this example, Alice is a subscriber of services provided by gifting platform 102. Alice has a smartphone (104) which has installed upon it an app (118) for communicating with platform 102 (through her account that links her app to the platform). The app allows Alice to perform functions such as purchasing, listening to, customizing, and gifting music, as will be described in more detail below.

Suppose Alice would like to gift a song to her friend Bob for his birthday, and also customize the song by including a personalized message embedded in the song. In this example, Bob also owns a smartphone (108), but is not a subscriber to gifting platform 102 and does not have the platform's accompanying application installed on his smartphone. Platform 102 can take a variety of forms, and can be operated by a variety of entities. For example, platform 102 can be implemented as (a) an independent gifting platform, (b) a part of an existing infrastructure (e.g., the iTunes® music service, Amazon® music service, etc.), or (c) act as a third-party service to be leveraged by other services. Platform 102 and the various client devices such as Alice's and Bob's respective smartphones communicate via one or more networks (depicted collectively in FIG. 1 as network cloud 106). Such networks can include wired, wireless, cellular, and satellite networks. Other examples of other client devices that can be used by users of platform 102 include personal computers (112), laptop computers (114), mobile telephony devices (116), etc.

In this example, Alice navigates the app installed on her phone to gift a song to Bob. Alice searches through a catalog of songs available on gifting platform 102 and selects one she would like to use as Bob's gift. In this example, Alice selects the song "The Bestest and Happiest Birthday Song Ever" from the catalog of available songs as the song that she would like to give to Bob. Various types of gifting, including permanent copies, lending, streaming, etc. will be described in more detail below. Further details of the music catalog and selection of songs will also be provided in more detail below.

With her song selected, Alice is presented with the option to personalize her gift. One example of a personalization includes embedding a custom, personalized message into the stream of the song. Alice decides that she would like to record the message "Happy Birthday, Bob!" and have the message fade-in and fade-out of the beginning of the song the first time that Bob plays the gifted song. The app provides Alice with a "record" button, which utilizes/leverages the built-in microphone of her smartphone device to allow her to record her message. Via the app, Alice can also provide other customization instructions, for example, the starting position/offset (e.g., beginning, middle, end of the song) of where in the song her recorded voice file should be included, any effects she would like to add (e.g., fade-in/fade-out, random placement of the recorded voice file, super-imposing of the recorded voice file, transitions, filters, etc.), etc. As will be described in more detail below, the recorded audio will be mixed into the song by the gifting platform according to the instructions specified by Alice. In this example, Alice's customization is an audio file that will be embedded in the audio song that she would like to gift. The customization can also be of a different media type than the content being gifted. For example, Alice can also select a video or a photo (e.g., background image or slideshow) to add as a customization to accompany the song she is gifting. Any combination of media types for customizations and content to be gifted can be selected. Other examples of customizations/personalizations and customization instructions will be described in more detail below.

Alice is prompted via the app to provide the contact information for the intended recipient of the gift, Bob. In this example, Alice has given the app permission to access her contacts manager on her phone. Via the app, Alice queries for Bob's name (e.g., by scrolling through her contacts or entering "Bob" in a search box), and Bob's name and phone number are retrieved/extracted from her contacts manager by the app. Other contact information available via the contacts manager (e.g., email address) can also be retrieved. In some embodiments, Alice directly enters (types) Bob's name and his phone number as the name of the recipient and contact information.

In addition to providing the song, customization, and recipient contact information for her gift, Alice can also be prompted to provide additional gifting instructions, such as scheduling the time of the song to be sent. This can be done, for example, to account for time zones if Bob lives in another part of the world. As another example, Alice may have remembered Bob's birthday a week in advance, and via the app, Alice can pre-emptively prepare the music gift and have it scheduled to be delivered to Bob on his birthday. Further details of scheduling and other gifting instructions will be provided in more detail below.

The gifting information indicated by Alice, including the song (e.g., indicated via a song identifier), recipient contact information (e.g., Bob's name and phone number, (555) 555-1212), customization, and any other appropriate information (e.g., scheduling instructions, customization instructions, etc.) is packaged by the app and sent to platform 102 (e.g., as the payload of a message). For example, after Alice has entered/selected the information for her gift, she can be prompted by the app to perform the gifting transaction by hitting a "gift" button in her app.

Gifting platform 102 includes an interface that receives the payload of information sent via Alice's app. As will be described in more detail, gifting platform 102 uses the information to process the gifting transaction and notify Bob of his gift. In this example, upon receiving the gifting information, the gifting platform charges Alice for the gifting of her transaction. Billing for the gift will be described in more detail below.

Gifting platform 102 determines whether Bob is a subscriber to the platform (e.g., whether he has an account with the platform). The gifting platform can use the phone number (and any other appropriate contact information) to determine whether there is an account for an existing user associated with the phone number. In some embodiments, the gifting platform can also determine that Bob is an existing user (e.g., that he has an account, has the corresponding app installed on one of his devices, etc.), whether Bob already has the song that Alice would like to gift him, and if so, notify Alice accordingly (e.g., so that she can select a different song to gift to Bob).

In this example, the gifting platform determines that Bob is not an existing user of the platform and that there is no account associated with Bob's phone number (i.e., the phone number is for a user for which an account does not exist on the platform).

In response to determining that Bob is not an existing user of the gifting platform, the gifting platform automatically/dynamically/pre-emptively generates an account for Bob on his behalf, thereby enrolling/registering him with the platform. In some embodiments, the auto-registration process includes creating a new account for Bob, creating a username/password (e.g., username=bob5555551212, password=bobisawesome) for the account (which Bob will be allowed to change later), etc. The song that Bob has been gifted by Alice (as well as the personalized message audio clip) can also be associated with Bob, indicating that the gifted song is now an asset belonging to him. Details of the auto-registration/enrollment process and asset-association will be described in more detail below.

Gifting platform 102 next prepares Alice's gifted song. As will be described in more detail below, this can include modifying the song according to Alice's personalization and customization instructions. For example, the gifting platform can generate a mixed version of the song, in which the Alice's personalized message is embedded/mixed-into the gifted song in the position that she indicated.

Gifting platform 102 next notifies Bob of his song. As part of the notification process, the gifting platform prepares a message to be sent to Bob. In this example, gifting platform generates a text message (e.g., SMS, MMS, etc.) that will be sent to Bob using the phone number provided by Alice. By using a text message, Bob will be immediately notified of the gift without the gifting platform having any knowledge of his phone (e.g., mobile operating system of the phone) and regardless of the type of phone that he owns (e.g., smartphone, phone without internet access, etc.).

The generated text message can include text, such as "Hi Bob, Alice has sent you a song," letting Bob know that his friend Alice is sending him a gift. Personalized text can also be provided by Alice to be included in the text message (e.g., Alice can prompted via her app to also include a personalized message along with her gifting information). In some embodiments, her recorded text can also be converted to text (e.g., using speech recognition software) to be included in the text message.

As part of the text generation process, the gifting platform also generates/configures a universal resource locator (URL) to be included in the text message, and which Bob will be prompted to click. In this example, the URL when clicked, links back (e.g., via callback) to the gifting platform and is used to detect information (e.g., identification information) about Bob's phone, such as the unique device identifier of his phone, the operating system of his phone (e.g., iOS®, Android®, Blackberry®, etc.), the version of the operating system, etc. The information can be extracted from a user agent/header of the request that is sent as part of the callback from Bob's phone to the gifting platform in response to Bob clicking on the link.

The generated text message is then sent to Bob using his phone number. As will be described in more detail below, the text message can be sent to Bob in several ways. In some embodiments, the text message is sent from gifting platform 102. In other embodiments, the text message is sent from Alice's phone. Having the text message originate from Alice's phone may increase the likelihood that Bob will open the text message, as it is from his friend, a trusted source. In order to have the text message originate from Alice's phone, in some embodiments, the gifting platform sends Alice the components of the message to be sent (e.g., text of the message, URL, etc.) via the app, and instructions for assembling the text message and to have the assembled text message sent from the app. However, depending on the underlying mobile operating system platform (e.g., iOS®, Android®, etc.) of Alice's (i.e., the gifter's) phone, the app installed on Alice's phone may not have access to text messaging functionality. Thus, the gifting platform may dynamically determine where the text message is to originate/be sent from (either from gifter's device or gifting platform) based on information about the gifter's device (e.g., underlying mobile operating system of gifter's phone, whether the gifter is sending the gift from a device other than a phone such as a laptop, etc.). For example, if Alice is gifting the song from her desktop rather than a smartphone, or her smartphone does not allow apps to have access text messaging functionality, the text message can be delivered by the gifting platform.

The generated text message is then sent to Bob (either from Alice's phone or from the gifting platform, as applicable) and is received at Bob's device. In this example, Bob's smartphone has Internet access and he opens the link embedded in the text message, which directs him back to the gifting platform. As described above, in response to clicking on the link, a request is sent from Bob's smartphone to the gifting platform, which detects identification information regarding Bob's phone, such as the phone's unique device identifier (e.g., deviceID specific to the Bob's particular phone), mobile operating system type, operating system version, etc.), for example, from a user agent/header of the request. The device information is then stored by the gifting platform and associated with Bob's auto-generated user account.

The device information associated with Bob's device is then analyzed by the gifting platform. Based on the device information, the gifting platform can redirect Bob's request to the gifting platform's accompanying proprietary app (e.g., the app that Alice has installed on her phone) in an appropriate "app store" (e.g., software distribution server 110) given Bob's phone type (e.g., iTunes if Bob has an iPhone®, the Google® play store if Bob has an Android pone, etc.), from which Bob can install the app on his phone to access the gifting platform and the song Alice has gifted him. Further details of device information detection will be described in more detail below.

After being redirected to the gifting platform's accompanying app in the app store appropriate for Bob's smartphone, Bob installs the app to his phone. In this example, Bob opens the installed application, which has been configured to automatically communicate with gifting platform 102, log-in with the auto-generated account previously/pre-emptively created on Bob's behalf, and sync with his account so that Alice's gift of the customized song is downloaded to his device. In some embodiments, Bob is sent a message including his auto-generated account credentials (e.g., username=bob5555551212, password=bobisawesome), which he can use to log into/take ownership of the pre-generated account created on his behalf. As the account was pre-generated for Bob, Bob does not have to undergo a registration process in which he must enter account information, and is simply directed to take ownership of the auto-generated account.

Now that the contents of Bob's phone has synced with the content/assets associated with Bob's account that are hosted on the gifting platform, Bob can use the app to listen to the song that Alice has gifted him. In some embodiments, the song is configured such that the personalized version including Alice's message is played only the first time that Bob opens the gift, but in subsequent plays, the original, unmodified song is played. In some embodiments, Bob has the option of how he would like the gifted song to be played (e.g., with or without the personalized message). Further details regarding delivery/playing of customized songs will be described in more detail below.

In some embodiments, after Bob has listened to the gifted song, the gifting platform records the event and notifies Alice that her song has been listened to. In some embodiments, after listening to the song, Bob is prompted by the app to send Alice a personalized message thanking her for the gift. Other actions that can be taken by Bob after installing and opening the app will be described in more detail below.

Gifting Platform

Figure 2:
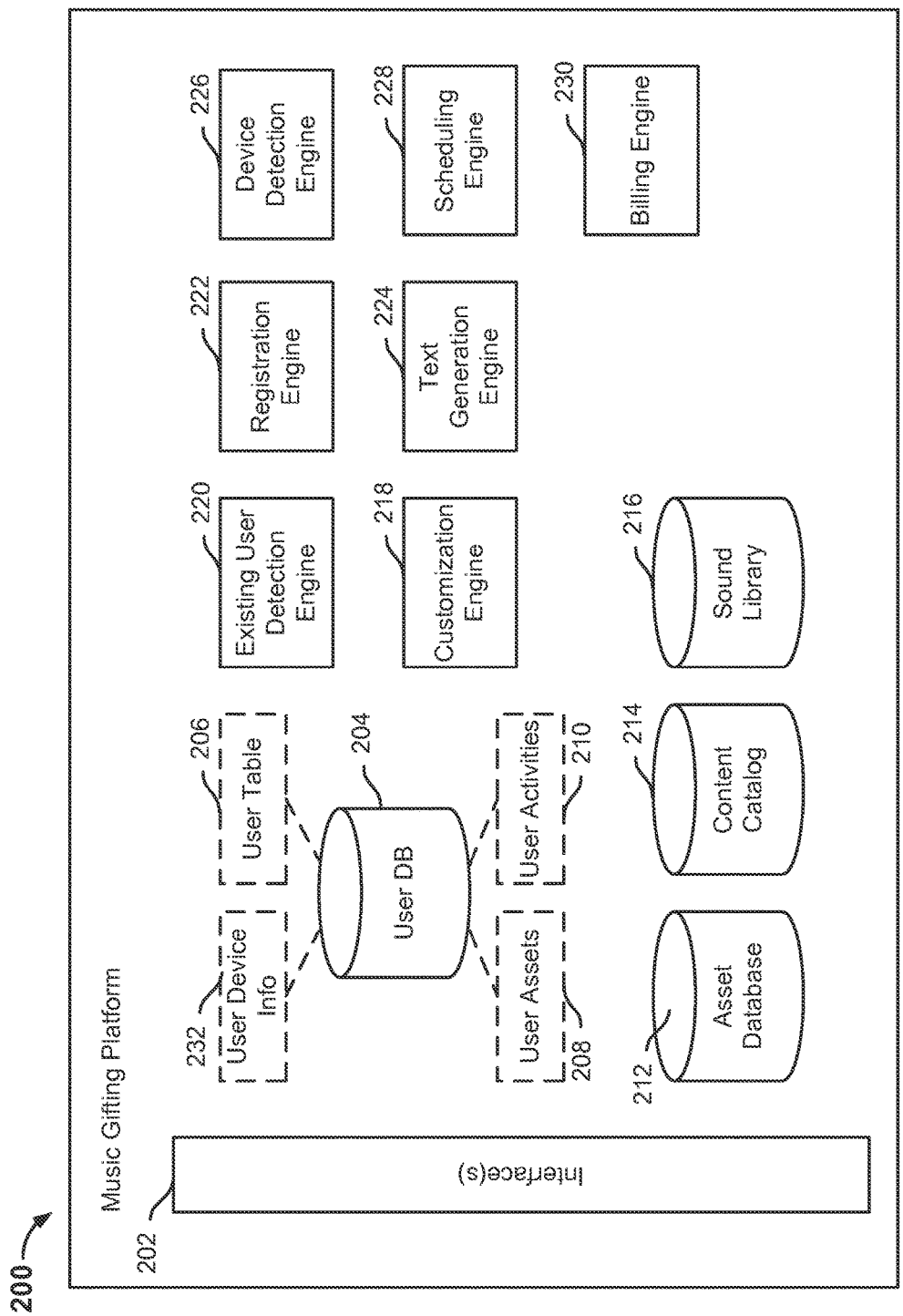
FIG. 2 illustrates an embodiment of a gifting platform.

FIG. 2 illustrates an embodiment of a gifting platform, such as gifting platform 102 of FIG. 1. In various embodiments, gifting platform 200 is an independent gifting platform, a part of an existing infrastructure/backend service provider (e.g., the iTunes® music service, Amazon® music service, etc.), acts as a third-party service that can be leveraged/utilized by other services, etc.

Gifting platform 200 includes one or more interface(s) 202 for communicating with client devices, such as Alice's and Bob's smartphones. As one example, platform 200 provides an application programming interface (API) configured to communicate with apps installed on client devices such as Alice's and Bob's smartphones (e.g., allowing apps to sync with users' respective accounts to access/download assets that are available to the users). In some embodiments, interfaces provided by the gifting platform include web interfaces that can be accessed via web browsers running on devices such as desktops, laptops, phones, tablets, or any other device with web access. The web interfaces can allow users of client devices to gift music without the need for a separately installed gifting application. The user interface can also be configured to transmit and receive text messages for alerting clients of the platform of gifts.

Gifting platform 200 includes user database 204. The user database includes information associated with the various users/subscribers of the gifting platform. In some embodiments the user database includes a user table 206, where each user of the gifting platform has an entry in the user table including the user's account information. The user's account information can include user names and passwords (including auto-generated temporary usernames/passwords that can be changed later on by a user). The user's account information can include contact information for the user, such as phone number, email address, etc. The user's account information can also include backend accounts created on the user's behalf. For example, if the gifting platform is a part of a music service infrastructure such as Amazon®, iTunes®, etc., ancillary accounts generated for a user on those platforms/backend providers can be included in the user's entry in the user database.

In some embodiments, the user's entry in the user table also includes device information (232) associated with the user. The device information can include information collected about the user's devices, such as the number of devices that the user owns, the unique device identifiers of the user's devices (e.g., deviceID for iPhones®, gmail address for Android® phones, etc.), the operating systems of the devices (e.g., iOS®, Android®, Blackberry OS®, Windows® Phone, etc.), the versions of the operating systems, etc. Using collected unique device identifiers, a user's entry in the user table can include the set of known device identifiers associated with a user, as well as the device identifiers that have, for example, the app for the gifting platform installed (e.g., in the case of smartphones). Thus, for example, when Bob installs the gifting platform app after being notified of Alice's gift, the device identifier for Bob's smartphone can be stored as device information for Bob's user entry in the user table, and the device identifier can be indicated as having the app installed. In some embodiments, if a user uninstalls the app from their device, a notification can be sent to the gifting platform, and the device identifier for the device is removed from the user's user entry (i.e., only device identifiers for devices that have the app installed are stored in the user's entry). The collection of a user's device information will be described in more detail below.

In some embodiments, each user in the user database is associated with an asset table 208 (or any other appropriate data structure). The asset table for the user includes the assets (e.g., audiovisual content) that belong (or are otherwise available) to the user. The asset table can include assets (e.g., indicated using unique content/asset identifiers) that are gifted to the user. For example, Bob's asset table would include the song gifted to him by Alice. Thus, Bob can listen to his assets at any time on the devices that he owns. The asset table for a user can also include any custom audio clips or customizations/personalizations to be integrated into audiovisual content (as well as any other user generated sounds/content such as composed greetings). For example, the audio clip of Alice's birthday message (or a link to the audio clip) can be saved in Bob's asset table. Instructions for how the custom content should be applied to audiovisual digital assets as described above (e.g., the song that a personalized message should be mixed into, effects, timing offsets, play the first time only, etc.) can also be included in the table. In some embodiments, user's assets can also include a "liveness" indicator, indicating when an asset is available to a user. For example, if Alice gifts a song to Bob in advance of his birthday, Alice can specify that the song should not be available to Bob until the day of his birthday (i.e., specifying scheduling instructions). In some embodiments, the asset table can include references to actual assets (e.g., linking to assets in an asset database).

In some embodiments, each user in the user database is associated with an activities table 210 (or any other appropriate data structure). The activities table can be used to record information/metrics/measures regarding a user's interactions with the user's content, such as how many times the user listens to a song, etc.

Gifting platform 200 includes asset database 212. The asset database can include the actual digital assets available on the platform that can be delivered (e.g., gifted) to users' client devices. In some embodiments, the asset tables associated with individual user entries include references (indicated using asset identifiers) to the actual assets included in the asset database. Examples of digital assets include audiovisual media in various formats, such as mp3, mp4, avchd, mpeg, mpeg2, wav, flac, jpeg, png, etc.

Gifting platform 200 includes content catalog 214. The content catalog includes a catalog of the various digital audiovisual content available on the gifting platform. In some embodiments, the content catalog is the same as the catalog that can be searched through via an app such as the app installed on Alice's smartphone that she used to search for a song to gift Bob. In some embodiments, the gifting platform includes its own existing catalog/library of songs.

In some embodiments, the gifting platform is a standalone platform that has struck deals with music labels to license the songs included in the catalog. In other embodiments, (e.g., if the platform is an integrated part of an existing infrastructure such as Amazon®), the catalog is maintained by the backend service provider. In some embodiments, the content included in the catalog is licensed from a specific group (e.g., Amazon®, Sony®, etc.). In some embodiments, several catalogs from different music services are provided (with the gifting platform being music service agnostic), offering users such as Alice the opportunity to purchase songs to gift from a number of music services (e.g., iTunes®, Amazon®, Sony®, etc.), where she can make her ultimate decisions on which music service catalog to buy the song from, for example, based on price.

Gifting platform 200 includes customization library 216. The customization library includes various existing/pre-configured customizations that users can select from to apply to audiovisual content that the users would like to gift. The customizations can include various types of media (e.g., videos, images, audio, etc.) to be applied to audiovisual content to be gifted. For example, stock images, music videos, gifs, audio messages, etc. can be included in the customization library, and which can be selected by a user to apply to the user's gift. As one example, the customization library includes pre-recorded audio files (e.g., of celebrities saying particular messages). In some embodiments, the gifting platform includes a text-to-speech synthesizer engine, in which a message entered by a user is synthesized, for example, using a celebrity voice. For example, instead of recording her own audio message to Bob, Alice can select, using her app, a celebrity voice to read a message of her choice (e.g., entered by Alice, selected from a set of stock phrases, etc.). As one example, Alice can select the option for a famous sports personality to say, "Happy Birthday, it's <the sports personality's name>," which will be included in the song she has sent to Bob. In some embodiments, the customization library also includes various effects, such as transitions, fade-in/fade-out, adjusting the beats of audio, filters (e.g., for photos, videos, etc.), etc. from which a user can choose from to apply to their customization/personalization of digital audiovisual content. In some embodiments, customization packs are offered to users. For example, Alice can purchase a pack of celebrity phrases (spoken by the celebrity), packs of effects, etc. that she can use when customizing gifted content.

Gifting platform 200 includes customization engine 218. The customization engine applies customizations to digital audiovisual content/assets to be gifted based on instructions provided, for example, by gifters. As described above, customizations includes personalized messages recorded by gifters, various effects such as transitions, pre-recorded messages (e.g., voiced by celebrities or other entities) selected by the gifter, etc. The customization engine then assembles a gift using the customizations according to the gifter's instructions, which in some embodiments includes timing instructions indicating the position of a customization to be embedded in gift content (e.g., instructions to mix a birthday message audio recording into a particular part of a gifted song), etc. In some embodiments, customization engine 218 creates a customized version of the gifted content, with both the modified and unmodified versions available to a gift recipient. In some embodiments, customization instructions are sent to the device of a gift recipient, which is instructed to assemble the customized version of the gifted content on the device itself.

Gifting platform 200 includes existing user detection engine 220. The existing user detection engine determines whether an entity is a subscriber to the gifting platform based on received contact information for the entity, which may be provided by a party other than the entity whose contact information has been received (e.g., Bob's phone number provided by Alice). As described in the example environment of FIG. 1, in order to facilitate frictionless gifting of audiovisual content, in some embodiments accounts for intended recipients who are not yet members of a gifting platform are pre-generated on the recipient's behalf. Thus, when the recipient would like to receive the gift that the recipient has been gifted, the recipient (i.e., potential new member of the gifting platform) needs only take ownership of the auto-generated/already existing account, without having to go through a registration process. Existing user detection engine 220 is configured to determine whether an entity is an existing user of the gifting platform. In some embodiments, contact information, such as an entity's phone number, email address, etc. (which are received from a gifter such as Alice) is used in the determination. In the event that an account associated with the contact information is not found/does not exist, an account is automatically generated for the entity, registering the entity with the gifting platform.

In some embodiments, if an intended recipient is determined to already be an existing user of the platform, the intended recipient's asset table can be evaluated to determine whether a song to be gifted is already owned by the recipient, and the gifter of the song can be notified accordingly.

Gifting platform 200 includes registration engine 222. Registration engine 222 creates accounts for users on the gifting platform. In some embodiments, the registration engine is configured to automatically/pre-emptively generate accounts on the gifting platform for entities who are determined to not be subscribers to the gifting platform. The auto-registration/enrollment/account creation process is performed in response to a determination as made by existing user detection engine 220. In some embodiments, the account creation process includes creating a user entry for the entity in user database 204. The account created includes the name and contact information (e.g., phone number provided by a gifter such as Alice) that was used by existing user detection engine 220 to determine that no user associated with the contact information existed on the gifting platform. In some embodiments, the account creation/enrollment includes automatically generating a temporary username (e.g., Bob's phone number)/password (e.g., random password) for the prospective new platform member, which the new member will be allowed to change later on. In some embodiments, if the gifting platform is a part of an existing infrastructure, such as Amazon®, an ancillary username/password combination is generated for the user on the backend service (e.g., an Amazon® account with the username Amazonuser_Bob_phone_number and a random password is created for the potential new member). In some embodiments, the account creation also includes associating content to be gifted to the recipient with the recipient's created user entry (e.g., it is recorded that Bob owns the song that Alice gifted him).

Gifting platform 200 includes text generation engine 224. The text generation engine generates notification alerts to be sent to users (and potential users) of the gifting platform. The notifications includes short message service (SMS), multimedia messaging service (MMS), or any other appropriate type of message that can be sent using contact information such as an entity's phone number. In some embodiments, the text generation engine is configured to assemble/construct/generate the text message. In the scenario in which a text message notifying a recipient of a gift is to be created, the text generation engine constructs a message including text indicating that a gifter would like to send the recipient a gift and instructions on how the gift can be received. In some embodiments, the text also includes personalized messages from the gifter (e.g., entered on the app installed on the gifter's smartphone device when gifting content).

In some embodiments, the text generation engine is configured to generate a URL to be embedded in the text message. In some embodiments, the text message includes text instructing a user to click on/activate the URL in order to receive the gift being sent to the user. The URL is configured such that when a user clicks on the link, a call-back request is initiated that is sent from the user's device back to the gift platform. In some embodiments, the call-back is processed by a device detection engine (e.g., device detection engine 226, described in further detail below), which evaluates the call-back to determine details of the user's device, and determine a further action to take (e.g., redirecting the user's request to an appropriate app store).

In some embodiments, the text generation engine is configured to accept replies to text messages. For example, in some embodiments, the text message sent to a user includes instructions for users whose phones do not have Internet/web access. For example, users who do not have Internet/web access, or cannot view the URL or click on it, are instructed to reply to the text message with a particular phrase (e.g., "XYZ"). The text generation engine, in response to receiving the reply then generates a text with alternative instructions for accessing gifted content. For example, in some embodiments, a text message is sent with the text of a URL (e.g., shortened tiny-url) that is encoded with an auto-generated/preconfigured username/password that the user can enter into a web browser (e.g., on the user's laptop computer) to log into the user's account to retrieve the user's gift. In some embodiments, the new URL is a one-time use URL that is configured to automatically expire a preset amount of time.

In some embodiments, the text generation engine is configured to send a generated notification text to a recipient from the gifting platform (e.g., via interface(s) 202). In some embodiments, the origination source of a gift text alert to be sent to an intended gift recipient is dependent upon the device used by the gifter.

In the example of FIG. 1, where the gifter, Alice, uses her gifting app to send a song to Bob, her smartphone may or may not allow an installed app to access text messaging (e.g., SMS, MMS, etc.) functionality. If it is determined that the gifter owns a mobile device that allows apps to send text messages (e.g., by evaluating the device information stored in the gifter's user account entry), the text generation engine is configured to instruct the app installed on the gifter's device to send the gifting text message alert to the recipient. In some embodiments, the instructions include various components of the text message to be sent (e.g., URL which will cause a call-back to the gifting platform), which are then passed to the gifter's client device. The app installed on the gifter's client device is then configured to construct a text message from the created components and send the text message to the recipient. In some embodiments, the app installed on the gifter's phone is instructed to create the URL to be embedded in the text message.

By causing the gift alert text to be sent from the gifter's device, an intended gift recipient can see that the gift alert text message is from a trusted source (e.g., a friend), incentivizing them to open the text message and follow instructions in the text message explaining how to access the gift.

In some embodiments the app is instructed to provide directions/instructions to a user, such as Alice, on how she can manually construct a text message to be sent to the intended gift recipient (e.g., with the URL and other content to include in the text message provided to her either by the app or the gifting platform).

If the text generation engine determines that a gifter's client device does not allow access to the device's text messaging capabilities, in some embodiments, the text generation engine is configured to directly send a gift alert text from the gifting platform. In some embodiments, gift alert text rules are configured such that the gift platform preferentially instructs a compatible mobile device to send gift alert text messages when possible.

Gifting platform 200 includes device detection engine 226. The detection engine collects and evaluates device information associated with a user. For example, when a gift recipient such as Bob clicks on a URL (generated, for example, by text generation engine 224), call-back is performed by Bob's smartphone device that directs back to the gifting platform. The call-back (which is received via a web front end of interface(s) 202) includes a request that includes a user agent/header that includes fields indicating device information for Bob's smartphone. The device information included in the call-back request includes a unique device identifier for the device, operating system of the device, version of the operating system, etc.

Based on a determination/evaluation of the type of client device operated by the recipient in response to activation of the link by the recipient, various actions are taken. In some embodiments, if the recipient is determined to have a smartphone that is capable of installing apps, the recipient is redirected to an app store (e.g., software distribution server 110 of FIG. 1) that is appropriate to the recipient's device to download the gifting platform's accompanying app. For example, if Bob is determined to own an Android® device, Bob's callback request is redirected to the gifting platform's accompanying app in an appropriate Android® app store, such as the Google play store. Having been automatically redirected to the app in the appropriate app store, Bob can then immediately download and install the app without having to search for the app manually.

In some embodiments, particular client device types may not be supported by the gifting platform. For example, an accompanying app for the gifting platform may not be available for particular mobile operating platforms, or a recipient's client device may not have web access. If a recipient's client device type is not supported by the gifting platform, the text generation engine is prompted by the device detection engine (e.g., based on device-type rules having been triggered in response to a device information evaluation) to generate a new text message to be sent to the recipient which includes a URL that the recipient can enter at a web browser of, for example, a laptop or desktop computer, in order to access the audiovisual content gifted to the recipient.

In some embodiments, if a recipient responds to a gift alert text and the recipient is determined to have a device with the gifting platform's accompanying app installed (e.g., determined via a search of the device id in the user table), the recipient is redirected to the app installed on the recipient's device.

Gifting platform 200 includes scheduling engine 228. Scheduling engine 228 facilitates the scheduling of gifting of customized audiovisual content (e.g., instead of gifting assets instantly). Gifts can be scheduled in advance or for particular times. For example, if the intended gift recipient is in a different time zone from the gifter, then the gifting can be scheduled for an appropriate time of day, for example, to avoid a gift text notification to be sent in the middle of the night to the gift recipient. As another example, referring to the example of FIG. 1, suppose that Alice remembered Bob's birthday one week prior to the actual day of his birthday. Alice can prepare the gift in advance (e.g., select the gift song, personalization, gift/customization instructions, etc.) and specify/indicate (via the app installed on her phone) a day and time that the gift should be delivered to Bob (which can also be included in received gift instructions). In some embodiments, based on the scheduled time, the scheduling engine provides scheduled instructions on when the text generation engine should have the gift alert text be generated and sent to Bob. Additionally, the scheduling engine can cause Alice's gift song to be added to the asset table of Bob's auto-generated account user entry, but indicate that the gift song has a "liveness," in which the gift song is not available (i.e., "live") to Bob until the scheduled date/time.

Gifting platform 200 includes billing engine 230. The billing module determines billing for transactions such as gifting transactions. For example, Alice can be charged for the song that she has selected to gift to Bob. Alice can pay for the transaction in various ways, for example, using a credit card that is on file and stored in her account information, using prepaid credits, etc. Users of the platform can also be billed for transactions such as in-app purchases, as well as the purchase of particular customizations (e.g., effects, celebrity voices, customization packs, etc.). Different customizations can also be priced differently (e.g., where pre-recorded messages by celebrities are priced higher than transition effects).

In some embodiments, gifting platform 200 is implemented using commercially available server-class hardware (e.g., having a multi-core processor(s), 16G+ of RAM, gigabit network interface adaptor(s), and hard drive(s)) running a typical server-class operating system (e.g., Linux). Whenever gifting platform 200 is described as performing a task, either a single component or a subset of components or all components of platform 200 may cooperate to perform the task. Similarly, whenever a component of platform 200 is described as performing a task, a subcomponent may perform the task and/or the component may perform the task in conjunction with other components. Further, at least some components of server 200 can be provided by one or more third parties in some embodiments. As one example, the contents of asset database 212 may be stored by a third party platform. As another example, the gifting platform and its components may be a portion of an infrastructure owned by a single operator (e.g., the gifting platform is a portion of iTunes®). As another example, the gifting platform may be an independent service that communicates with/is used in conjunction with other music services such as iTunes®, Sony®, etc., with content catalog 214 and/or user database 204 (in which ancillary backend accounts specific to the music service are generated for users) owned/hosted by the music service.

Figure 3:
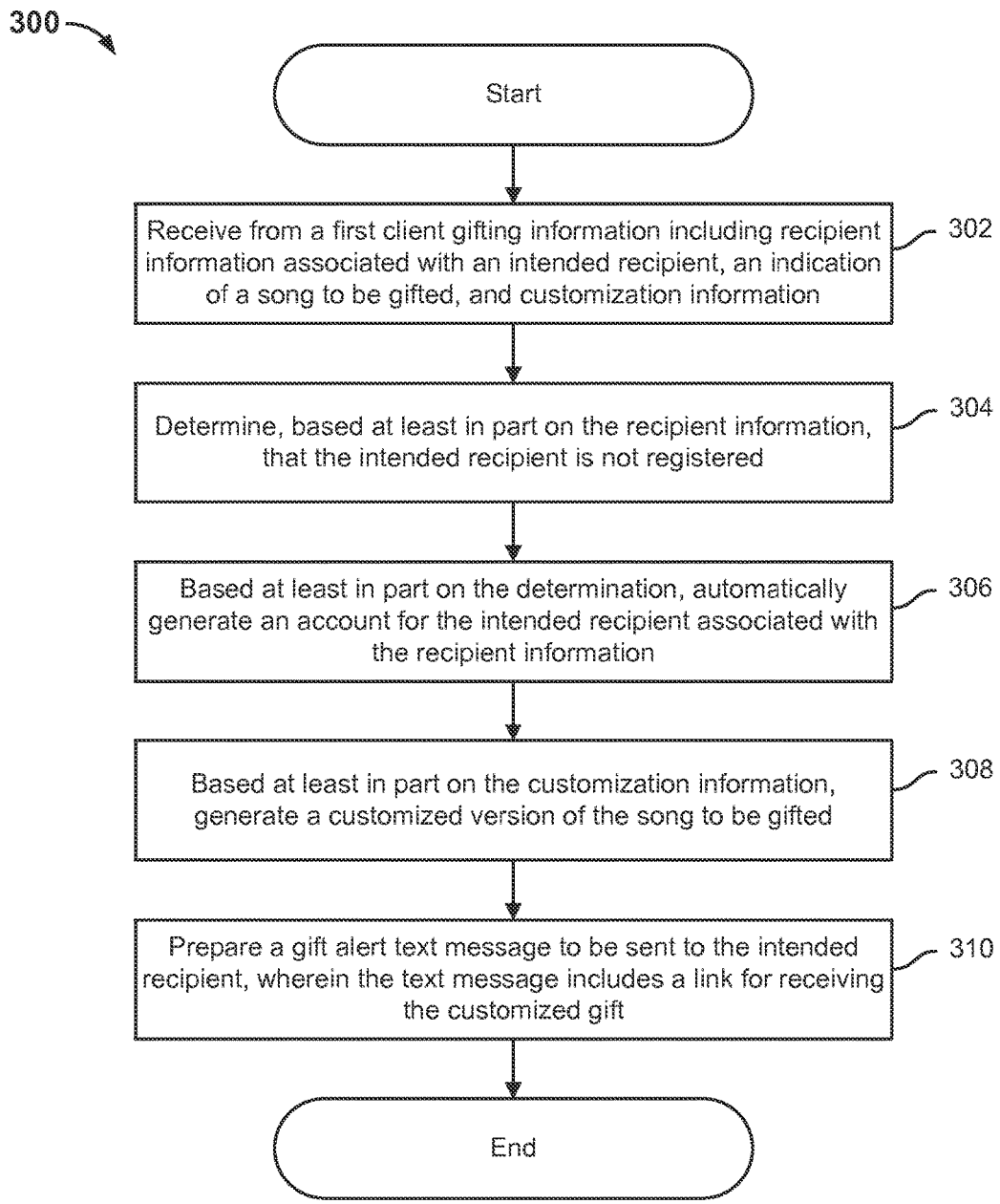
FIG. 3 illustrates an embodiment of a process for gifting customized audiovisual content.

FIG. 3 illustrates an embodiment of a process for gifting customized audiovisual content. In some embodiments, process 300 is executed by platform 200 of FIG. 2. The process begins at 302, when gifting information is received from a first client (e.g., Alice's app 118). The gifting information can include recipient information associated with an intended recipient, and indication of audiovisual content to be gifted, customization information, etc. For example, referring to the environment of FIG. 1, Alice (the gifter) can gift a song (audiovisual content to be gifted) to Bob, providing his phone number (recipient information), and well as a personalized recorded message and instructions on how the recorded message should be included in the song (customization information, such as timing position information, effects, etc.). The gifting information can also include additional information, such as scheduling information.

At 304, the intended recipient is determined, based on the received recipient information, to not be registered (e.g., with a gifting service platform such as gifting platform 200 of FIG. 2). For example, it can be determined that an account associated with Bob's phone number does not exist on the gifting service that Alice is using. At 306, an account for the intended recipient is generated based on the determination. For example, as no account exists for Bob, the intended recipient (i.e., Bob is not a member of the gifting service), an account is pre-emptively prepared/generated for him, which Bob can take immediate ownership of upon being alerted of Alice's gift.

At 308, a customized version of the audiovisual content to be gifted is generated based at least in part on the customization information. For example, a version of the song that Alice would like to be gifted can be created that has the birthday message recorded by Alice mixed into the song.

At 310, a gift alert text message to be sent to the intended gift recipient is prepared/produced/constructed/composed, the text message including a link for receiving the customized version of the audiovisual content. For example, a text message to be sent to Bob is prepared, including text indicating that Alice has gifted Bob a birthday song, with the text message including a link that when clicked on by Bob, will allow him to receive his gift. Clicking on the link causes Bob's smartphone to be redirected to the gifting app used by Alice (which corresponds to the gifting service used), where the app that Bob is redirected to is appropriate for/corresponds to the type of Bob's phone (e.g., based on mobile operating system). In some embodiments, as described above, the gift alert text message is sent from the gifting service. In other embodiments, as described above, the gift alert text message is sent from the gifter's client device (e.g., when possible).

Figure 4:
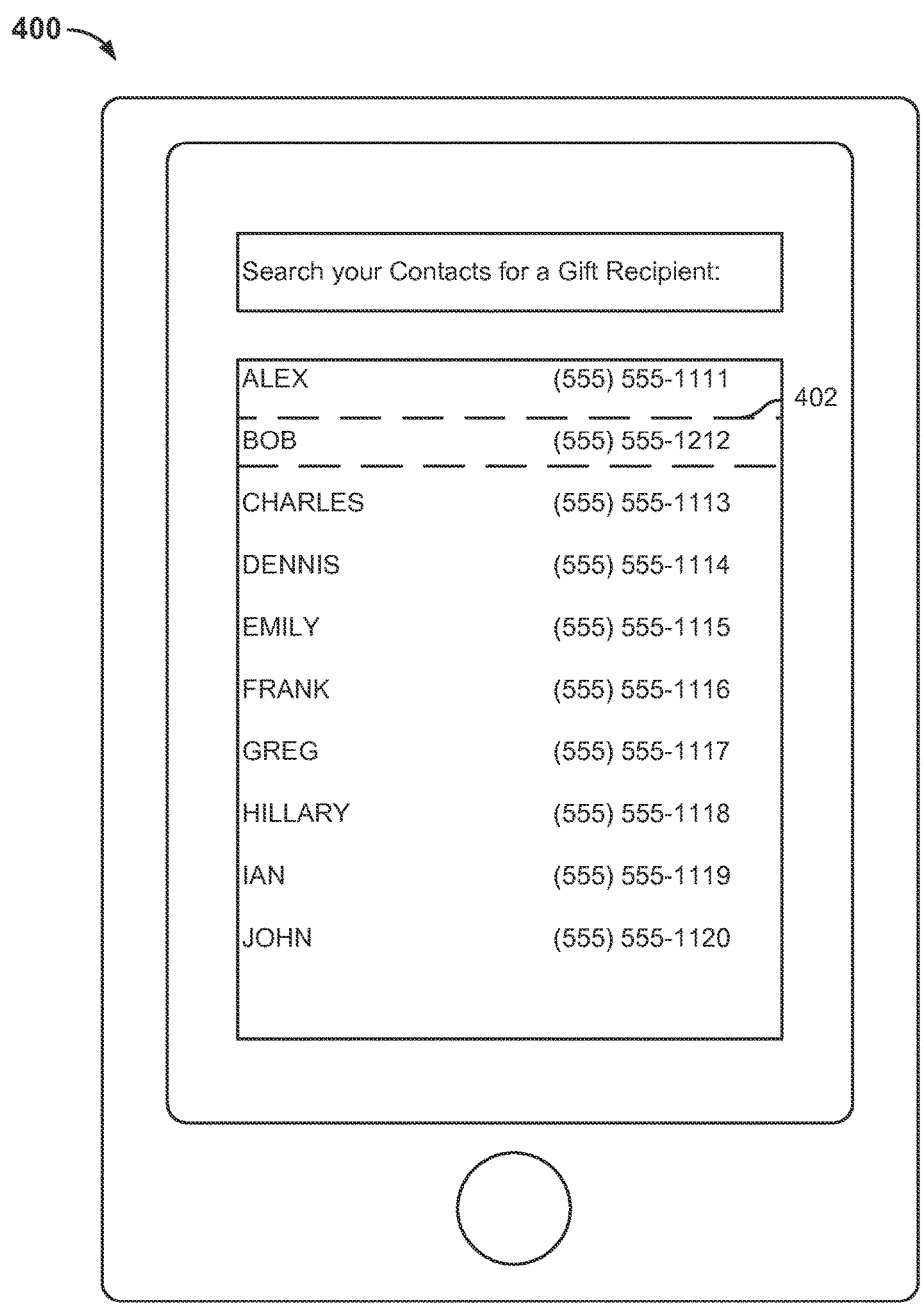
FIG. 4 illustrates an embodiment of an interface.

FIG. 4 illustrates an embodiment of an interface. An example of an app interface presented to Alice on her smartphone for gifting music to her friend Bob is shown. In this example, Alice is prompted to select the person that she would like to send a gift to. In this example, Alice has given the app permission to access her contacts manager, and Alice can enter Bob's name or scroll through her contacts to search for Bob's name. At 402, Bob is selected, with his phone number (555) 555-1212.

Figure 5:
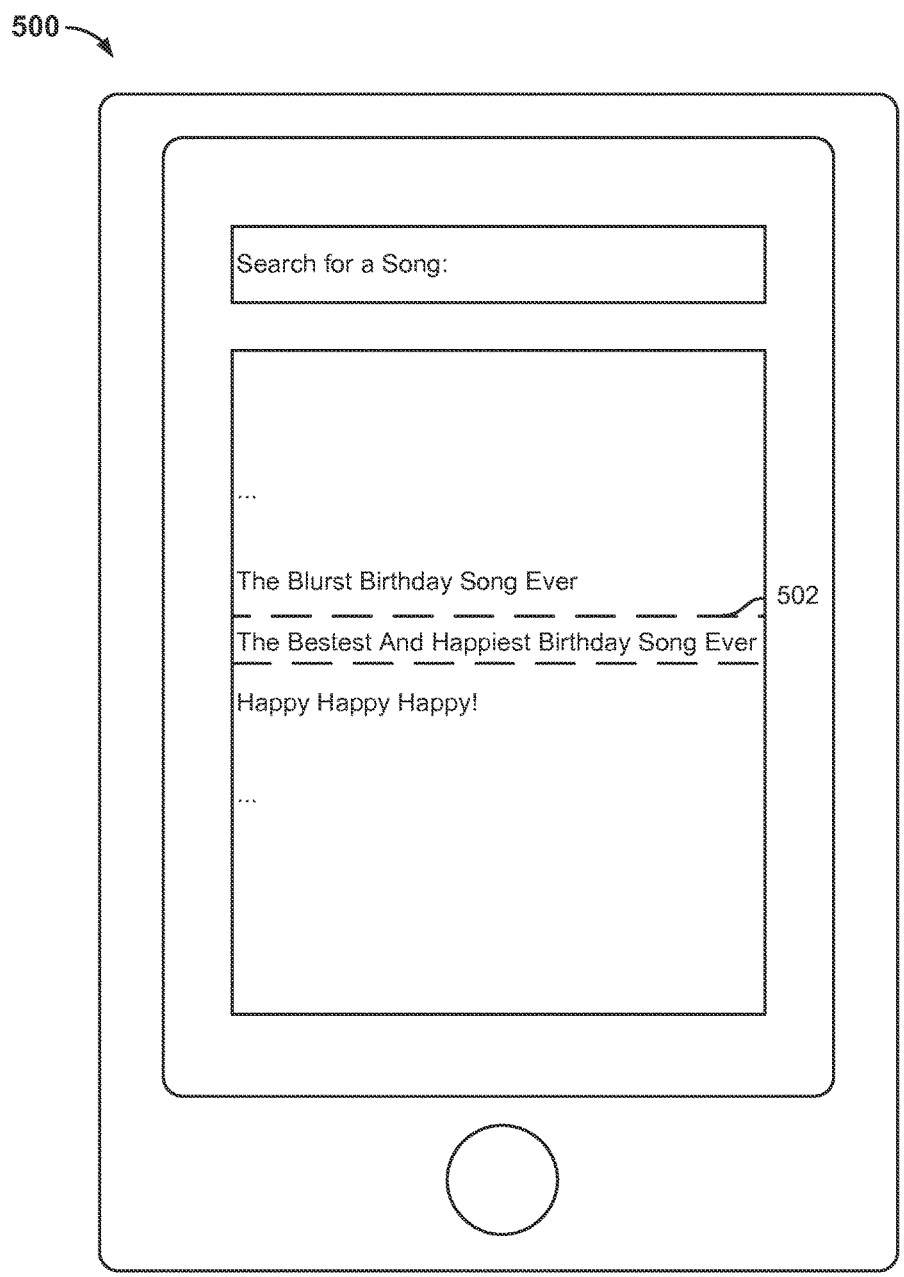
FIG. 5 illustrates an embodiment of an interface.

FIG. 5 illustrates an embodiment of an interface. Continuing with the example of FIG. 4, Alice is prompted to select the song which she would like to send to Bob. As shown, Alice can select/search from a catalog of songs (e.g., by scrolling a list of songs or entering the name/title of a song), which, in this example, is the same as the existing library catalog offered by the gifting platform connected with the app. In this example, Alice has selected "The Bestest and Happiest Birthday Song Ever" to send to Bob.

Figure 6:
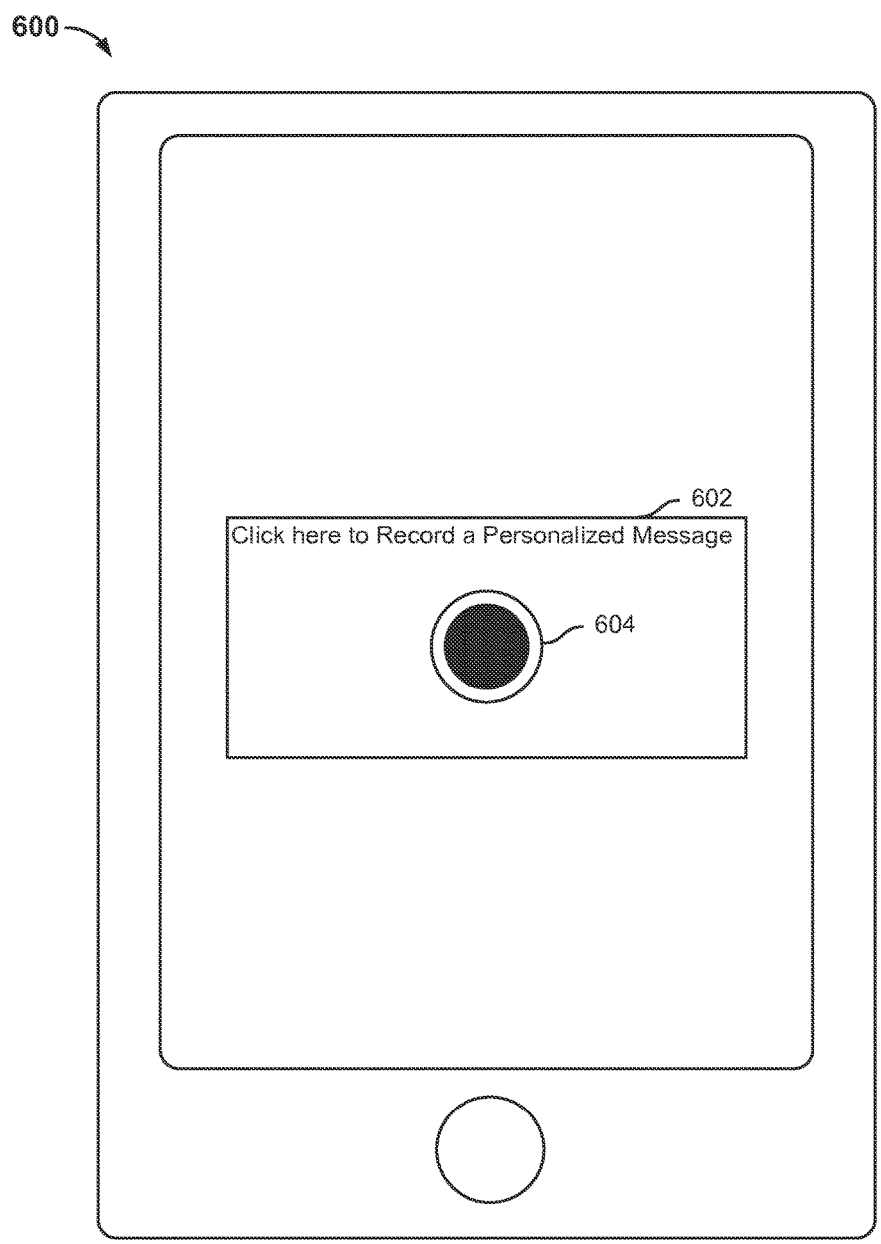
FIG. 6 illustrates an embodiment of an interface.

FIG. 6 illustrates an embodiment of an interface. Continuing with the example of FIG. 5, Alice is asked whether she would like to personalize her gift song. In the example shown, at 602, Alice is asked whether she would like to record a personalized message. By clicking on region 604, the app uses the built-in microphone on Alice's smartphone to record her personalized message, which will be used to customize the song she is gifting to Bob.

Figure 7:
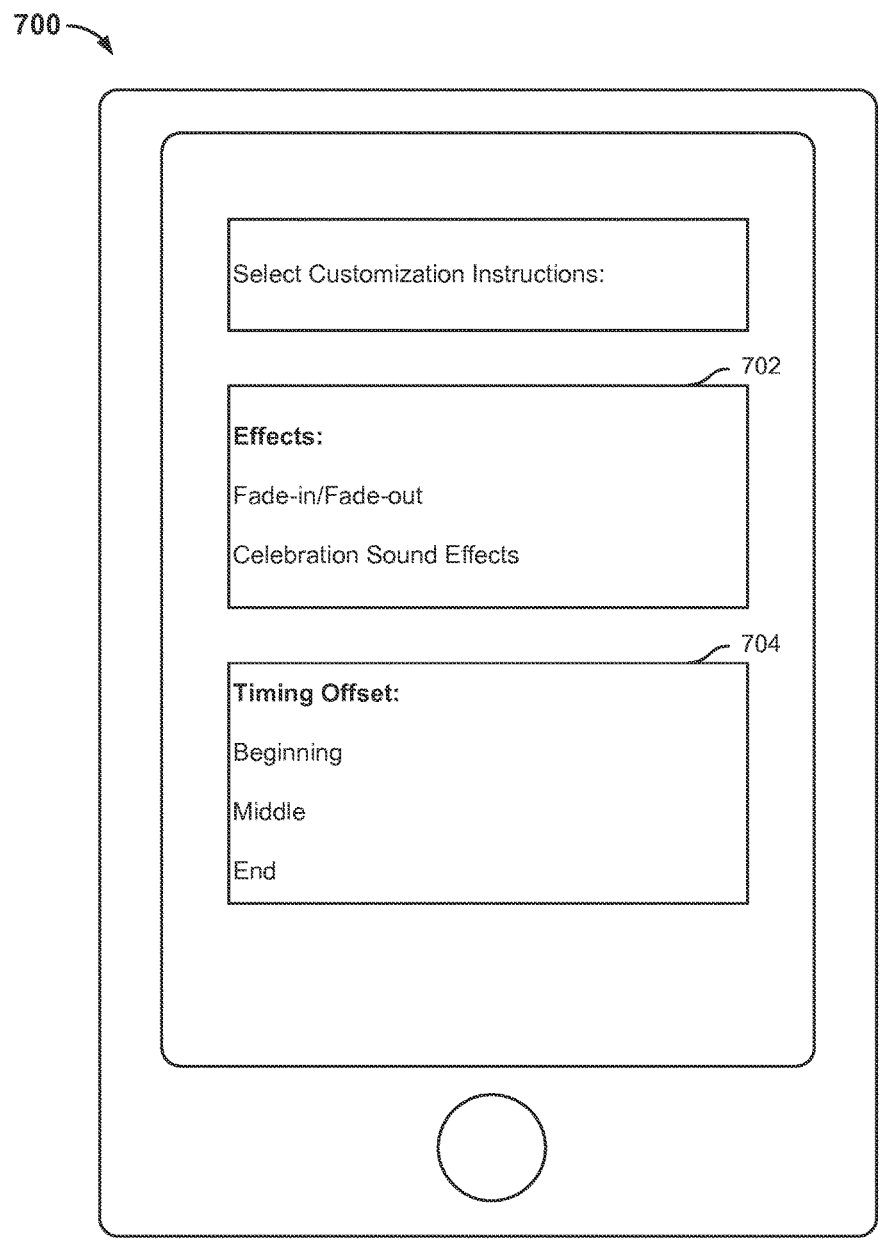
FIG. 7 illustrates an embodiment of an interface.

FIG. 7 illustrates an embodiment of an interface. Continuing with the example of FIG. 6, Alice is prompted to select instructions for applying her personalized message to the song to be gifted. In this example, customization instructions include effects (702) and timing offset (704), which indicates where in the song Alice's personalized recorded message should be mixed in.

Figure 8:
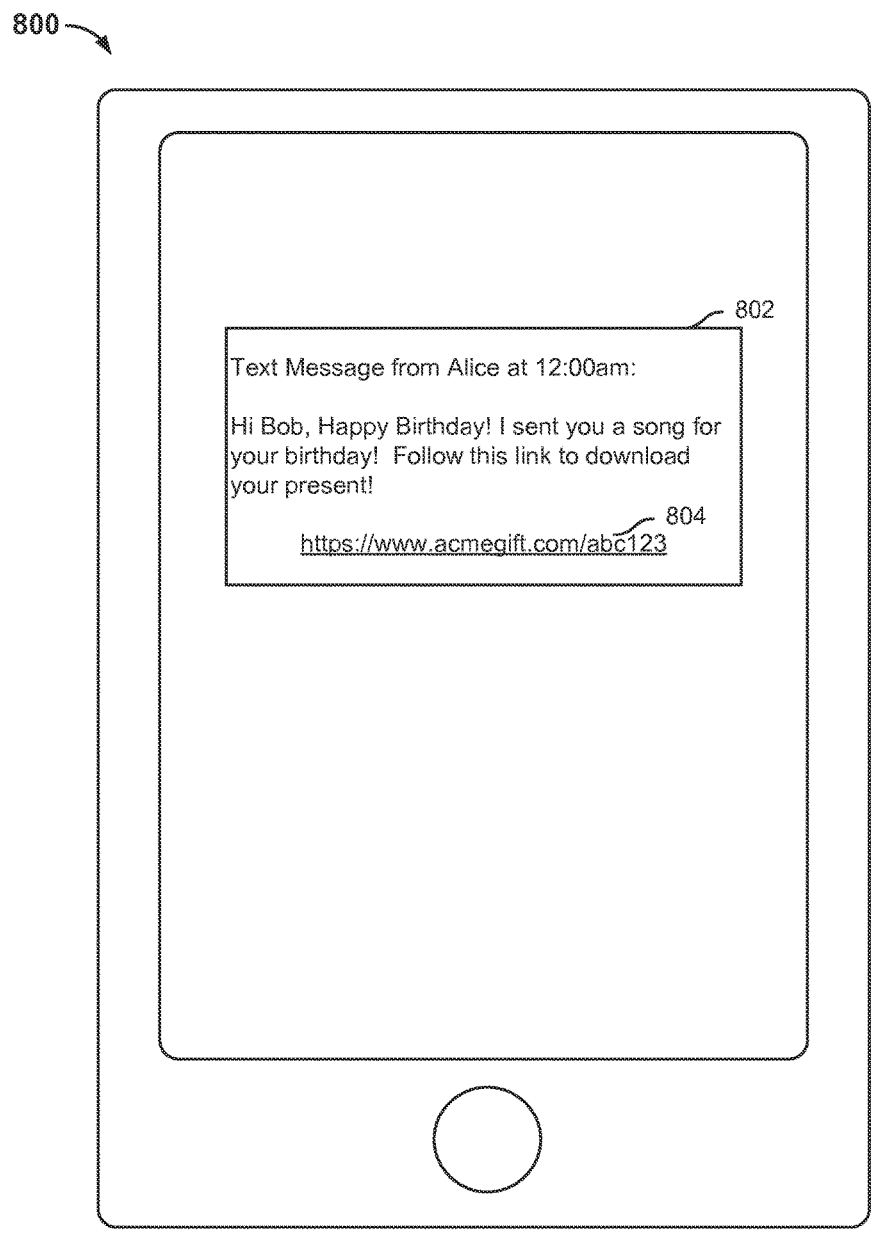
FIG. 8 illustrates an embodiment of a text message.

FIG. 8 illustrates an embodiment of a gift text message. Continuing with the example of FIGS. 4-7, Alice has prepared her gift, and a text message has been sent to Bob (the recipient) alerting that Alice would like to gift him a song. The text message shown (802) is displayed on the display of his smartphone. In this example, the text message is sent from Alice's smartphone, and includes a link (804), which when clicked on by Bob, will direct him to the gifting app in the app store appropriate to his smartphone device. Upon installing the app, the app will automatically sync to his account, whereby the song that Alice gifted him (including the personalized message) will be downloaded to his phone for listening. In some embodiments, Bob is notified, for example, via text or push notification to the installed app of the auto-generated account credentials for his account (e.g., username=bob5555551212, password=bobisawesome). In some embodiments, the initial gift text alert message includes the account credentials used to access Bob's auto-generated account. In some embodiments, Bob is redirected to install a specific instance of an app created for him by the gifting platform (and placed on the appropriate app store), which will automatically sync with his account.

Social Media/Network Integration

In some embodiments, users of the gifting service can link the users' gifting accounts to social networks that the users may be members of, such as Facebook® (e.g., using Facebook® Connect), MySpace®, etc. The gifting service can then leverage (with permission from users) the social media information to enhance gifting functionality.

As one example, social network integration can be used to assist in gift recommendation. For example, Alice's gifting service account can be connected to her Facebook® account, and the app/gifting platform (as applicable) can extract Bob's information from his Facebook® profile to determine his favorite bands. Recommendations can then be provided to Alice regarding songs to gift to Bob. The song recommendation can be implemented as a component of a gifting platform such as a gifting platform 200 of FIG. 2, can be implemented using a third-party engine/service, etc.

Social network integration can also be used to generate reminders for sending gifts. For example, using Alice's social network credentials (with her permission) to access her friends' profiles on various social networks (or also calendars), information regarding birthdays, anniversaries, or any other event information can be collected, and Alice can be sent notifications reminding her of her friends' (or her own) significant events. For example, Bob's birthday can be determined, with Alice notified one week in advance of his birthday of the event, asking her whether she would like to send him a song as a gift. The notification can also include recommended songs to gift Bob, as described above.

Thank You Messages

In some embodiments, after an intended gift recipient has received a gift, the recipient is asked (e.g., via an app if the recipient has a smartphone device and has installed a corresponding gifting) whether the recipient would like to have a thank you message sent to the gifter. The message can be a default thank you message, or the recipient can be prompted to enter a personalized message which will be sent to the gifter.

Exchanging of Gifts

In some cases, the gift to an intended recipient, such as a song may already be owned by the intended recipient (e.g., purchased on a different music service), or the recipient may not wish to keep the gift. In some embodiments, the recipient is provided the opportunity to exchange the gift. For example, if Bob already owns a CD of the song that Alice has gifted him, he is presented with the option to exchange Alice's gifted song with another song.

Shared Gifting Experience

In some embodiments, audiovisual content that is gifted can be experienced by both the gifter and the gift recipient. For example, an option can be provided in which Alice and Bob listen to the gifted song together at the same time, or for a videoconferencing app to be launched so that Alice can watch Bob's expression as he listens to his gift.

Alternative Gifting Options

In the example of FIG. 1, Alice gifted a song to Bob, which Bob owns. Other gifting options can also be provided. As one example, a playlist of songs can be gifted, in which multiple songs are selected to be gifted to a gift recipient. The playlist can be a playlist that is importable on a recipient's device. In some embodiments, gifters are charged only for the songs which are not already owned by the recipient. For example, suppose Alice would like to gift a playlist of ten specific songs to Bob, and that Bob already owns six of the songs. The entire playlist can be sent as a gift to Bob, allowing him to listen to all ten songs as a set (as intended by Alice), with Alice only being charged for four of the songs (i.e., the four songs Bob does not already own).

As another example gifting option, audiovisual content can be gifted but limited to a specific number of plays. For example, Alice can gift Bob a single free play of a song, which can be done at a reduced price to Alice relative to allowing Bob to "own" the song. In one example implementation, Bob's app monitors/keeps track of the number of times that Bob plays a song, which is also recorded in a user activities record associated with Bob's user entry on a backend gifting platform (e.g., user activities 210 of FIG. 2). When the designated number of plays has been reached, the gifted song is then removed from Bob's user assets record (e.g., user assets 208 of FIG. 2).

As another example gifting option, a lending based model can be implemented, in which a gifter's assets are loaned to a recipient. For example, Alice can loan a song that she owns to Bob as a gift, where Bob can stream the song from Alice's assets. As the song is loaned, Alice cannot access the song while it is loaned to Bob. Audiovisual content can be loaned for a particular period of time (e.g., for a week). Referring to gifting platform 200 of FIG. 2, lending can be implemented, for example, by adding the loaned song to Bob's user assets table (e.g., user assets 208 of FIG. 2), with a "liveness" indicated for a particular time period, during which the loaned song in Alice's asset table is indicated as being unavailable to Alice for the same time period. Bob's and Alice's respective apps can be synced with the backend gifting platform such that the loaned song is respectively available and unavailable to Bob and Alice's apps during the loan period. After the loan period is over, the loaned song can be removed from Bob's user assets table, and Alice's loaned song can be returned, or otherwise indicated as being available in her user assets table.

Visual Media Gifting

In the example of FIG. 1, Alice gifted a song to Bob, which Bob owns. In addition to audio content, other media, such as visual content can also be gifted. For example, Alice can gift Bob a music video. Alice can also customize the video, for example, by using her smartphone to record a video clip of her dancing and providing instructions indicating how the recorded video clip should be included in the video (e.g., as an interstitial). As another example, Alice can create a slideshow, in which she accompanies gifted music with pictures that she has taken, owns, or can purchase from the gifting platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, from a first client, gifting information comprising: an indication of audiovisual content to be gifted, customization information, and mobile device contact information associated with an intended recipient;
determine, based at least in part on the received mobile device contact information, that the intended recipient is not registered;
in response to the determination that the intended recipient is not registered, dynamically generate, based at least in part on the mobile device contact information, an account for the intended recipient, wherein the account for the intended recipient is associated with an asset table, and wherein the asset table includes a set of assets;
generate, based at least in part on the customization information, a customized version of the audiovisual content to be gifted and include the customized version of the audiovisual content as an asset in the set of assets;
prepare a gift alert text message to be sent, at least in part by using the mobile device contact information, to the intended recipient, wherein the gift alert text message includes a link for accessing the customized version of the audiovisual content;
receive, from a second client, a callback request in response to the link included in the gift alert text message having been clicked; and
based at least in part on device information included in the received callback request, determine a capability of the second client to install an application usable to access the dynamically generated account, and selectively: (1) redirect the second client to a software distribution entity, or (2) transmit a set of instructions to the second client, based on the capability determination;
and
a memory coupled to the processor and configured to provide the processor with instructions.

2. The system recited in claim 1, wherein the mobile device contact information comprises a phone number associated with the intended recipient.

3. The system recited in claim 2, wherein determining that the intended recipient is not registered includes determining that an account associated with the phone number does not exist.

4. The system recited in claim 1, wherein the audiovisual content comprises a digital song.

5. The system recited in claim 1, wherein the customization information includes a recorded message.

6. The system recited in claim 5, wherein the recorded message is a personalized message recorded by the first client.

7. The system recited in claim 5, wherein the customization information includes instructions for applying the recorded message.

8. The system recited in claim 5, wherein the customization information includes one or more transition effects.

9. The system recited in claim 5, wherein the customization information includes a timing offset.

10. The system recited in claim 5, wherein the recorded message comprises a message selected from a library of pre-recorded messages.

11. The system recited in claim 5, wherein the customization information includes a customization that is of a different type from the audiovisual content to be gifted.

12. The system recited in claim 1, wherein the mobile device contact information is extracted from a contacts manager of a mobile device associated with the first client.

13. The system recited in claim 1, wherein generating the account includes creating a temporary username and password for the intended recipient, without input from the intended recipient.

14. The system recited in claim 1, wherein the processor is further configured to send the gift alert text message.

15. The system recited in claim 1, wherein a device associated with the first client is instructed to send the gift alert text message.

16. The system of claim 1, wherein the device information included in the received callback request comprises at least one of a device identifier and a mobile operating system identifier.

17. The system recited in claim 1 wherein the processor is further configured to redirect the second client to a software distribution entity to install the application and wherein the software distribution entity is selected based at least in part on the device information included in the received callback request.

18. The system recited in claim 1 wherein the processor is further configured to generate a subsequent text message including a set of instructions for accessing the audiovisual content gifted to be sent to the intended recipient.

19. A method, comprising:
receiving, from a first client, gifting information comprising: an indication of audiovisual content to be gifted, customization information, and mobile device contact information associated with an intended recipient;
determining, based at least in part on the received mobile device contact information, that the intended recipient is not registered;
in response to the determination that the intended recipient is not registered, dynamically generating, based at least in part on the mobile device contact information, an account for the intended recipient, wherein the account for the intended recipient is associated with an asset table, and wherein the asset table includes a set of assets;
generating, based at least in part on the customization information, a customized version of the audiovisual content to be gifted and include the customized version of the audiovisual content as an asset in the set of assets;

preparing a gift alert text message to be sent, at least in part by using the mobile device contact information, to the intended recipient, wherein the gift alert text message includes a link for accessing the customized version of the audiovisual content;

receiving, from a second client, a callback request in response to the link included in the gift alert text message having been clicked; and based at least in part on device information included in the received callback request, determining a capability of the second client to install an application usable to access the dynamically generated account, and selectively: (1) redirecting the second client to a software distribution entity, or (2) transmitting a set of instructions to the second client, based on the capability determination.

20. The method of claim 19, wherein the mobile device contact information comprises a phone number associated with the intended recipient.

21. The method of claim 20, wherein determining that the intended recipient is not registered includes determining that an account associated witth the phone number does not exist.

22. The method of claim 19, wherein the audiovisual content comprises a digital song.

23. The method of claim 19, wherein the customization information includes a recorded message.

24. The method of claim 23, wherein the recorded message is a personalized message recorded by the first client.

25. The method of claim 23, wherein the customization information includes instructions for applying the recorded message.

26. The method of claim 23, wherein the customization information includes one or more transition effects.

27. The method of claim 23, wherein the customization information includes a timing offset.

28. The method of claim 23, wherein the recorded message comprises a message selected from a library of pre-recorded messages.

29. The method of claim 23, wherein the customization information includes a customization that is of a different type from the audiovisual content to be gifted.

30. The method of claim 19, wherein the mobile device contact information is extracted from a contacts manager of a mobile device associated with the first client.

31. The method of claim 19, wherein generating the account includes creating a temporary username and password for the intended recipient, without input from the intended recipient.

32. The method of claim 19, further comprising sending the gift alert text message.

33. The method of claim 19, wherein a device associated with the first client is instructed to send the gift alert text message.

34. The method of claim 19, wherein the device information included in the received callback request comprises at least one of a device identifier and a mobile operating system identifier.

35. The method of claim 19, further comprising redirecting the second client to a software distribution entity to install the application and wherein the software distribution entity is selected based at least in part on the device information included in the received callback request.

36. The method of claim 19, further comprising generating a subsequent text message including a set of instructions for accessing the audiovisual content gifted to be sent to the intended recipient.

37. A computer program product, the computer program product being embodied in a tangible, non-transitory computer readable storage medium and comprising computer instructions for:

receiving, from a first client, gifting information comprising: an indication of audiovisual content to be gifted, customization information, and mobile device contact information associated with an intended recipient;

determining, based at least in part on the received mobile device contact information, that the intended recipient is not registered;

in response to the determination that the intended recipient is not registered, dynamically generating, based at least in part on the mobile device contact information, an account for the intended recipient, wherein the account for the intended recipient is associated with an asset table, and wherein the asset table includes a set of assets;

generating, based at least in part on the customization information; a customized version of the audiovisual content to be gifted and include the customized version of the audiovisual content as an asset in the set of assets;

preparing a gift alert text message to be sent, at least in part by using the mobile device contact information, to the intended recipient, wherein the gift alert text message includes a link for accessing the customized version of the audiovisual content;

receiving, from a second client, a callback request in response to the link included in the gift alert text message having been clicked; and based at least in part on device information included in the received callback request, determining a capability of the second client to install an application usable to access the dynamically generated account, and selectively: (1) redirecting the second client to a software distribution entity, or (2) transmitting a set of instructions to the second client, based on the capability determination.

38. The computer program product of claim 37, wherein the mobile device contact information comprises a phone number associated with the intended recipient.

39. The computer program product of claim 38, wherein determining that the intended recipient is not registered includes determining that an account associated with the phone number does not exist.

40. The computer program product of claim 37, wherein the audiovisual content comprises a digital song.

41. The computer program product of claim 37, wherein the customization information includes a recorded message.

42. The computer program product of claim 41, wherein the recorded message is a personalized message recorded by the first client.

43. The computer program product of claim 41, wherein the customization information includes instructions for applying the recorded message.

44. The computer program product of claim 41, wherein the customization information includes one or more transition effects.

45. The computer program product of claim 41, wherein the customization information includes a timing offset.

46. The computer program product of claim 41, wherein the recorded message comprises a mesage selected from a library of pre-recorded messages.

47. The computer program product of claim 41, wherein the customization information includes a customization that is of a different type from the audiovisual content to be gifted.

48. The computer program product of claim 37, wherein the mobile device contact information is extracted from a contacts manager of a mobile device associated with the first client.

49. The computer program product of claim 37, wherein generating the account includes creating a temporary username and password for the intended recipient, without input from the intended recipient.

50. The computer program product of claim 37, further comprising computer instructions for sending the gift alert text message.

51. The computer program product of claim 37, wherein a device associated with the first client is instructed to send the gift alert text message.

52. The computer program product of claim 37, wherein the device information included in the received callback request comprises at least one of a device identifer and a mobile operating system identifier.

53. The computer program product of claim 37, further comprising computer instructions for redirecting the second client to a software distribution entity to install the application and wherein the software distribution entity is selected based at least in part on the device information included in the received callback request.

54. The computer program product of claim 37, further comprising computer instructions for generating a subsequent text message including a set of instructions for accessing the audiovisual content gifted to be sent to the intended recipient.

* * * * *